United States Patent
Ochiai et al.

(10) Patent No.: US 7,046,257 B2
(45) Date of Patent: May 16, 2006

(54) IMAGE SIGNAL PROCESSING APPARATUS AND METHOD

(75) Inventors: Kazunori Ochiai, Yamanashi-ken (JP); Tetsuro Nagakubo, Yamanashi-ken (JP)

(73) Assignee: Pioneer Corporation, Tokyo-to (JP)

(*) Notice: Subject to any disclaimer, the term of this patent is extended or adjusted under 35 U.S.C. 154(b) by 117 days.

(21) Appl. No.: 10/725,347

(22) Filed: Dec. 2, 2003

(65) Prior Publication Data

US 2004/0174384 A1 Sep. 9, 2004

(30) Foreign Application Priority Data

Dec. 3, 2002 (JP) .............................. 2002-350648

(51) Int. Cl.
*G09G 5/00* (2006.01)
*G09G 5/36* (2006.01)

(52) U.S. Cl. ...................................... 345/617; 345/560

(58) Field of Classification Search ................ 345/589, 345/593–595, 617, 345
See application file for complete search history.

(56) References Cited

U.S. PATENT DOCUMENTS

| 5,898,436 | A | * | 4/1999 | Stewart et al. | 345/594 |
|---|---|---|---|---|---|
| 6,166,719 | A | * | 12/2000 | Cariffe | 345/690 |
| 6,333,752 | B1 | * | 12/2001 | Hasegawa et al. | 715/64 |
| 6,870,955 | B1 | * | 3/2005 | Lee et al. | 382/165 |
| 2003/0076312 | A1 | * | 4/2003 | Yokoyama | 345/204 |

* cited by examiner

*Primary Examiner*—Ryan Yang
(74) *Attorney, Agent, or Firm*—Sughrue Mion, PLLC

(57) ABSTRACT

In response to operational instructions for changing an image quality parameter accepted in an operation unit, an image signal for displaying at least two identical images based on an inputted image signal on an image plane is generated. Further, an image quality adjusting processing is performed based on an image quality parameter before adjusting image quality with respect to a part of the generated signal for displaying an identical image, and another image quality adjusting processing is performed based on an image quality parameter after adjusting image quality with respect to another part of the generated signal for displaying another identical image.

6 Claims, 3 Drawing Sheets

FIG. 2A ORIGINAL IMAGE

IMAGE SIGNAL PROCESSING APPARATUS AND METHOD

BACKGROUND OF THE INVENTION

1. Field of the Invention

The present invention belongs to the technical field of an image signal processing apparatus and method performing an image quality processing in accordance with image quality parameters.

2. Related Background Art

In conventional display devices, such as a plasma display panel, a liquid crystal display, an EL(Electro Luminescence) display, a CRT, a user adjusts various image quality parameters, such as brightness, a contrast, sharpness, a tint, etc., so as to keep a status of a image display appropriate while comparing a status of an image display before adjusting which the user memorizes with a status of an image after adjusting.

However, in the conventional way to adjust quality of an image display, the user has to memorize a status of an image display before adjusting and compare the status with a status of an image display after adjusting, so that a result of adjusting depends on the user's memory. Therefore, it is difficult to adjust quality of an image display appropriately since a change of the quality before and after adjusting cannot be realized easily.

SUMMARY OF THE INVENTION

An object of the present invention is to provide an image signal processing apparatus and method capable of easily adjusting quality of an image display.

The above object of the present invention can be achieved by an image signal processing apparatus of the present invention. The apparatus is provided with: an operation device which accepts operational instructions for changing an image quality parameter of an inputted image signal; an image signal generation circuit which generates an image signal for displaying at least two identical images based on the inputted image signal on one image plane; an image quality adjusting circuit which performs an image quality adjusting processing based on an image quality parameter before adjusting image quality with respect to a part of the generated image signal for displaying one of the identical images, and performs an image quality adjusting processing based on an image quality parameter after adjusting image quality with respect to another part of the generated image signal for displaying another one of the identical images, in response to the operational instructions for changing the image quality parameter accepted by the operation device.

The above object of the present invention can be also achieved by an image signal processing method of the present invention. The method is provided with the processes of: accepting operational instructions for changing an image quality parameter of an inputted image signal; generating an image signal for displaying at least two identical images based on the inputted image signal on one image plane; performing an image quality adjusting processing based on an image quality parameter before adjusting image quality with respect to a part of the generated image signal for displaying one of the identical images in response to the accepted operational instructions for changing the image quality parameter; and performing an image quality adjusting processing based on an image quality parameter after adjusting image quality with respect to another part of the generated image signal for displaying another one of the identical images, in response to the accepted operational instructions for changing the image quality parameter.

BRIEF DESCRIPTION OF THE DRAWINGS

FIG. 2A is a diagram showing an example of a display image of a display device when not adjusting image quality;

DETAILED DESCRIPTION OF THE PREFERRED EMBODIMENTS

Figure 1:
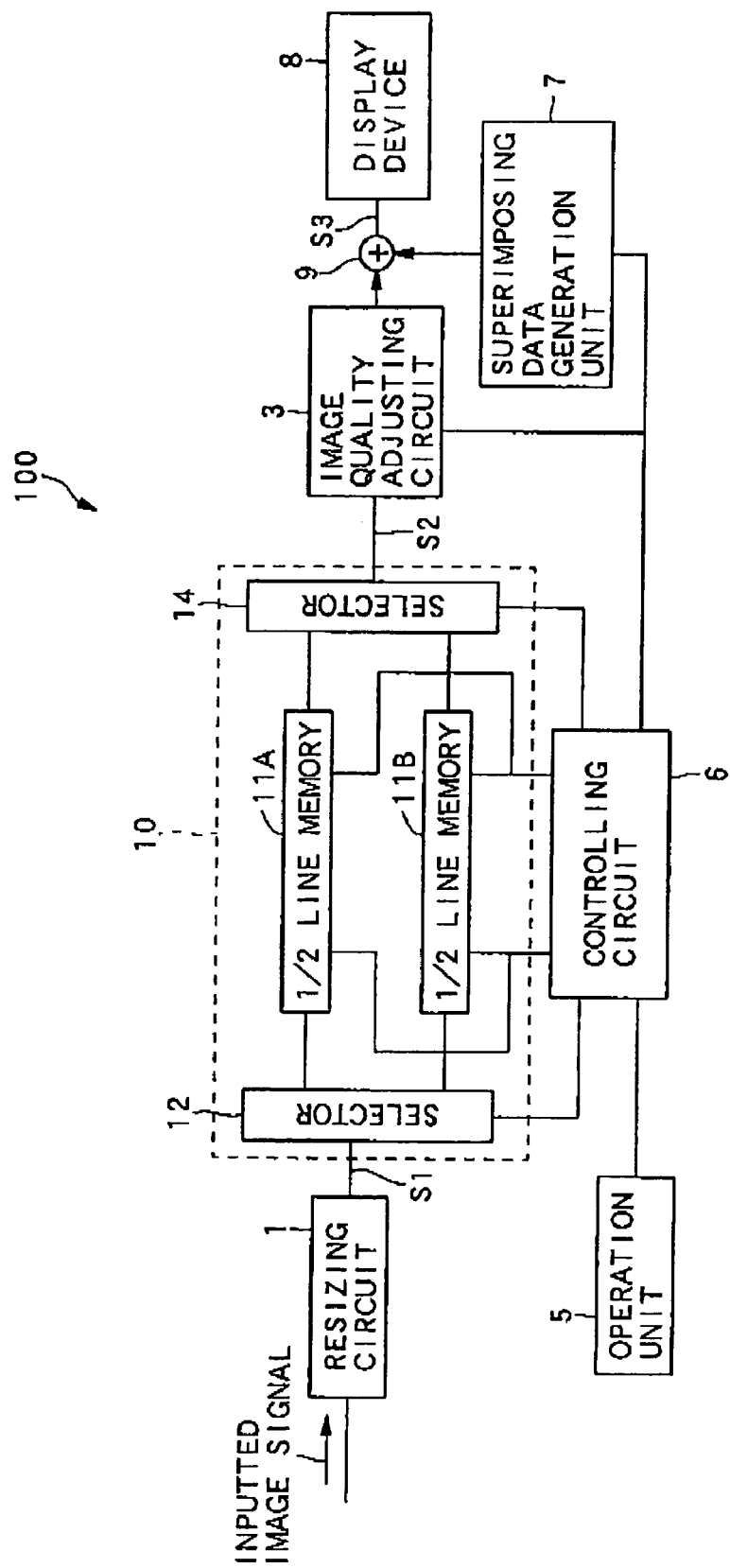
FIG. 1 is a block diagram showing an image signal processing apparatus of a preferred embodiment of the present invention.
Figure 2B:
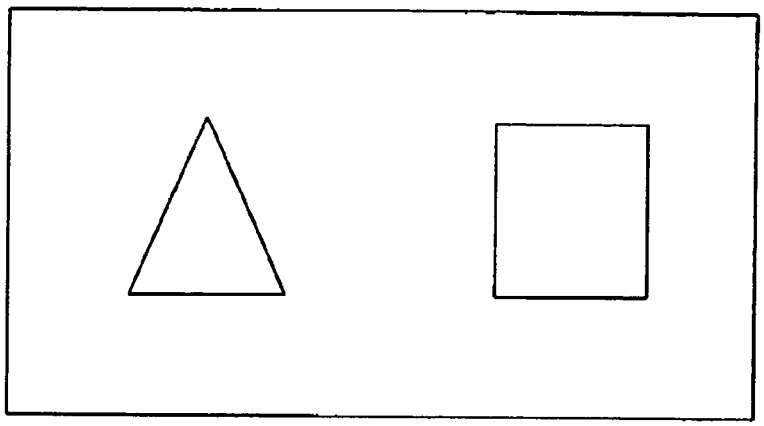
FIG. 2B is a diagram showing an example of a display image of the display device when adjusting image quality.
Figure 2B:
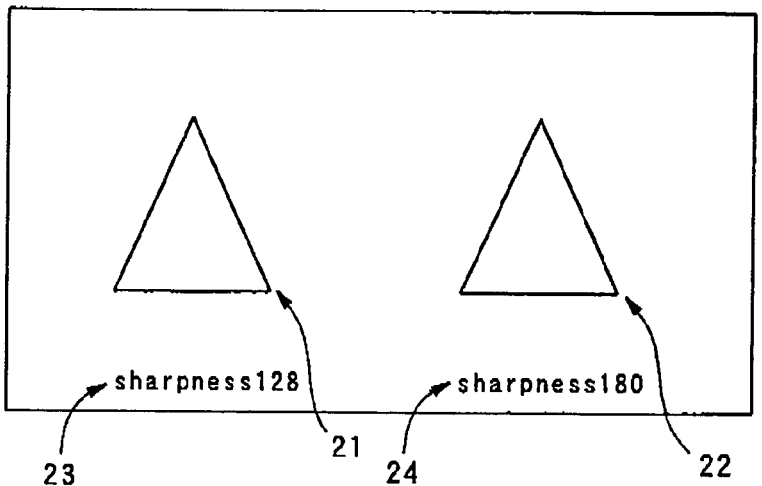
Figure 2C:
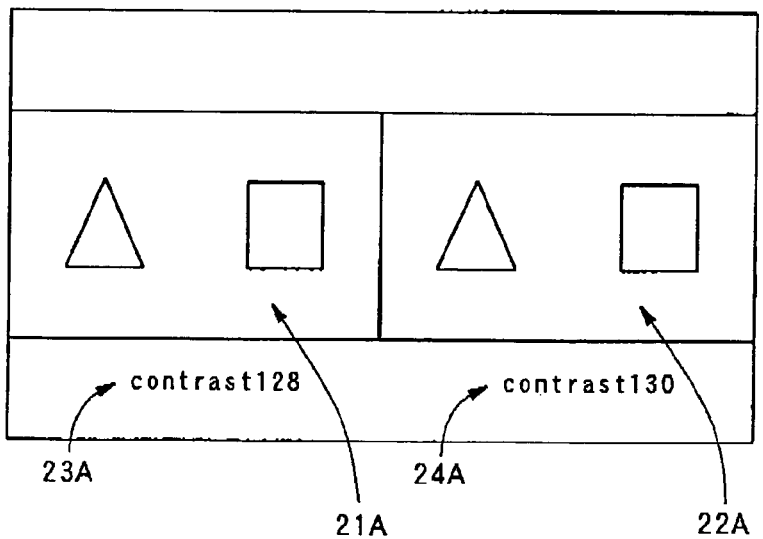
FIG. 2C is a diagram showing an example of reducing an original image at the time of the adjustment.
Figure 3:
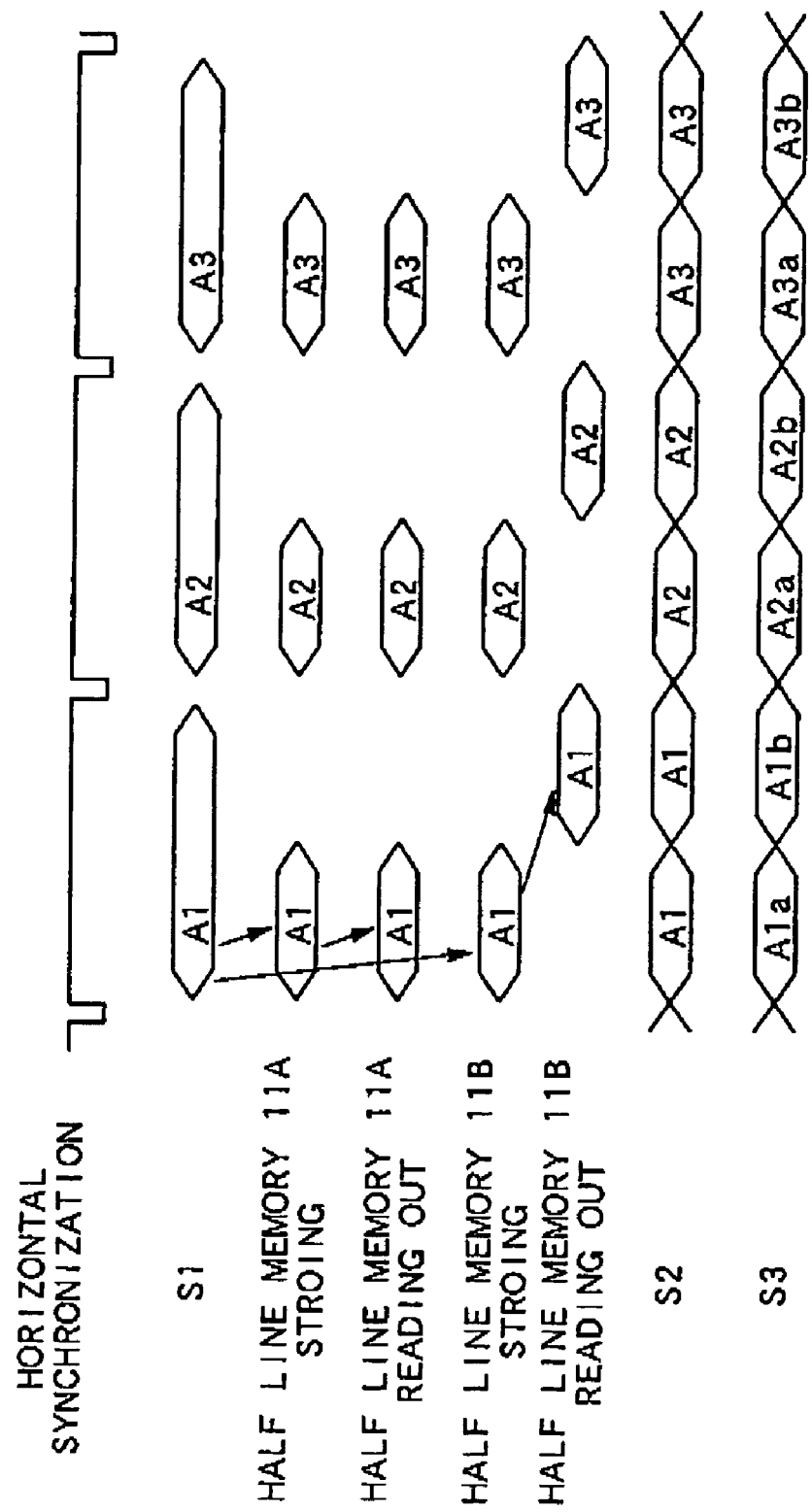
FIG. 3 is a timing chart indicating an operation timing of the image signal processing apparatus.

Referring to FIGS. 1 to 3, a preferred embodiment of an image signal processing apparatus of the present invention will be described.

As shown in FIG. 1, an image signal processing apparatus 100 of the preferred embodiment 100 is provided with: a resizing circuit 1 which resizes an image with receiving an input image signal; a double image generation circuit 10 which generates two identical images; an image quality adjusting circuit 3 which adjusts quality of image data outputted from the double image generation circuit 10; an operation unit 5 which accepts a user's operation; a controlling circuit 6 which controls each element of the image signal processing apparatus; a superimposing data generation unit 7 which generates image data for superimposing image quality parameters defining image quality on an image plane; a display device 8 which displays an image; and an adder 9.

The double image generation circuit 10 is provided with: half line memories 11A and 11B which sequentially memorize image data outputted from the resizing circuit 1; a selector 12 for selecting either of the half line memories 11A and 11B for storing image data; and a selector 14 for selecting either of the half line memories 11A and 11B for reading out the image data.

Referring to FIGS. 2 to 3, an operation of the image signal processing apparatus 100 of the preferred embodiment will be described. The operation of the image signal processing apparatus 100 is performed under the control of the controlling circuit 6.

FIG. 2A indicates an example of a display image of the display device 8 in normal times, that is, when not adjusting image quality.

In this case, an inputted image signal which is inputted into the resizing circuit 1 is outputted to the double image generation circuit 10 as an inputted image signal S1 without giving a resizing processing in the resizing circuit 1. The selector 12 in the double image generation circuit 10 is switched by the controlling circuit 6 so as to divide the inputted image signal S1 to the half line memory 11A and half line memory 11B alternately by data in a half horizontal scanning period. That is, image data, which constitutes the left half of an image plane of the display device 8, among the inputted image signals S1 in one horizontal scanning period, is stored in the half line memory 11A. Image data, which constitutes the right half of the image plane of the display device 8, among the inputted image signals S1 in one horizontal scanning period, is stored in the half line memory 11B.

When reading out image data stored in the half line memories 11A and 11B, the selector 14 is switched by the controlling circuit 6 so as to recreate an original image. Then, an image signal S2 corresponding to the inputted image signal S1 is outputted to the image quality adjusting circuit 3. That is, image data, which constitutes the left half of the image plane of the display device 8, is read out from the half line memory 11A. Image data, which constitutes the right half of the image plane of the display device 8, is read out from the half line memory 11B. The image data is outputted as the image signal S2.

The image quality of the image signal S2 is adjusted by the image quality adjusting circuit 3, then the image signal S2 is outputted to the display device 8 as a display signal S3. In the display device 8, for example, an original image is displayed as shown in FIG. 2A.

On the other hand, FIG. 2B indicates an example of a display image of the display device 8 when adjusting image quality.

When the controlling circuit 6 detects that an operation for adjusting image quality is performed in the operation unit 5, the controlling circuit 6 controls each element of the image signal processing apparatus 100 to switch an image plane of the display device 8 to one as indicated in FIG. 2B. FIG. 3 is a timing chart indicating an operation timing when adjusting image quality.

When adjusting image quality, an inputted image signal which is inputted into the resizing circuit 1 is outputted to the double image generation circuit 10 as an inputted image signal S1 without giving a resizing processing in the resizing circuit 1. The selector 12 in the double image generation circuit 10 is switched by the controlling circuit 6 so as to store image data constituting the left half of an image plane to the half line memory 11A and half line memory 11B. Therefore, the same image data is stored in the half line memory 11A and half line memory 11B. That is, as shown in FIG. 3, only a half line of image data located in the first half of each one horizontal line of image data is stored in the half line memories 11A and 11B among each one horizontal line of image data A1, A2 . . . , of the inputted image signal S1 partitioned with a horizontal synchronization signal. The data stored in the half line memories 11A and 11B is the same data. Image data constituting the right half of the image plane of the display device 8 among the inputted image signals S1, that is, a half line of image data located in the second half of each one horizontal line of image data A1, A2 . . . , is not stored in the half line memories 11A, 11B and not used as data constituting the image plane.

When reading out image data stored in the half line memory 11A and half line memory 11B, the selector 14 is switched by the controlling circuit 6 so as to read out a half line of the image data stored in the half line memory 11A and half line memory 11B alternately. Thus, the image signal S2, in which the same image data A1, A2 . . . , constituting the left half of the image plane of the display device 8, continues twice, is stored in the image quality adjusting circuit 3.

Image quality parameters in the image quality adjusting circuit 3 are switched concurrently with input timing of image data, that is, at a half period of a horizontal synchronization signal, by the controlling circuit 6. One of the switched image quality parameters is a parameter before adjusting image quality. The other is a parameter after adjusting image quality (This parameter includes a parameter during adjustment of image quality. The same applies to the following descriptions). By switching these parameters alternately at a half period of a horizontal synchronization signal, it is possible to assign an image in accordance with the parameter before adjusting image quality to the left side of the image plane, and to assign an image in accordance with the parameter after adjusting image quality to the right side of the image plane. Therefore, the same image having different image quality parameters can be displayed from side to side on the image plane.

In FIG. 3, among image data included in the image signal S3 outputted from the image quality adjusting circuit 3, the image data in accordance with the image quality parameter before adjusting image quality is indicated as A1$a$, A2$a$ . . . , and the image data in accordance with the image quality parameter after adjusting image quality is indicated as A1$b$, A2$b$ . . . As shown in FIG. 3, in the first half of one horizontal scanning period partitioned with a horizontal synchronization signal, the image data in accordance with the image quality parameter before adjusting image quality is outputted from the image quality adjusting circuit 3. Then, in the second half of one horizontal scanning period partitioned with a horizontal synchronization signal, the image data in accordance with the image quality parameter after adjusting image quality is outputted from the image quality adjusting circuit 3. Therefore, as shown in FIG. 2B, an image 21 in accordance with the image quality parameter before adjusting image quality is displayed in the left half of the image plane of the display device 8. Then, an image 22 in accordance with the image quality parameter after adjusting image quality is displayed in the right half of the image plane of the display device 8.

In the superimposing data generation unit 7, image signal of an image indicating image quality parameter after adjusting image quality is generated in accordance with the instruction from the controlling circuit 6. In an adder 9, the image signal generated in the superimposing data generation unit 7 is superimposed on an image signal outputted from the image quality adjusting circuit 3. As shown in FIG. 2B, on the basis of the image signal generated in the superimposing data generation unit 7, an image 23 indicating a value of the image quality parameter before adjusting image quality is displayed in an area of the left half of the image plane, and an image 24 indicating a value of the image quality parameter after adjusting image quality is displayed in an area of the right half of the image plane.

When a user performs an operation for adjusting image quality parameters in the operation unit 5, an image in accordance with a change of the image quality parameters and the image before adjusting image quality are displayed side by side in substantially real time. It is possible to realize a value of the image quality parameters at that time. Therefore, a user can easily obtain most appropriate image quality by adjusting a value of the image quality parameters while comparing the same image displayed from side to side on the image plane in accordance with the image quality parameters having the different value.

In the embodiment, the image quality parameters include a contrast, sharpness, a tint, and so on.

An image having the different size from that of an original image may be displayed at the time of the adjustment of image quality by performing a resizing operation in the resizing circuit 1. In this case, the display size of the image may be changed on the basis of the operation of a user. FIG. 2C indicates a display example of reducing an original image at the time of the adjustment. In FIG. 2C, the same images 21A, 22A before and after adjusting image quality are reduced compared with an original image and displayed side by side. It is possible to display the same images side by side in the whole of an original image or in a wide area of an original image. Therefore, the image parameters may be adjusted more precisely by reducing an image. In FIG. 2C, an image before adjusting image quality is an image 21A, and an image after adjusting image quality is an image 22A. An image 23A indicates image quality parameters before adjusting image quality, and an image 24A indicates image quality parameters after adjusting image quality.

The embodiment is explained with examples of displaying the same moving images side by side at the time of the adjustment. However, static images may be displayed instead of the moving images.

In the embodiment, an image before adjusting image quality is displayed in the left side, and an image after adjusting image quality is displayed in the right side. However, there is no limitation of arranging images. For example, the same images having different image quality may be displayed in the upper side and lower side on the image plane respectively. Three or more same images may be displayed side by side. In this case, the image quality parameters can be displayed with different values respectively.

As explained above, the image signal processing apparatus of the embodiment is provided with: the operation unit 5 which accepts operational instructions for changing image quality parameters; the double image generation circuit 10 which generates the image signal S3 for displaying the same two images on one image plane on the basis of an inputted image signal in response to the operation of changing the image quality parameters in the operation unit 5; and the image quality adjusting circuit 3, which, in response to the operation of changing the image quality parameters in the operation unit 5, performs image quality processing on the basis of the image quality parameters before adjusting with respect to one part of a signal for displaying one image in an image plane, and performs image quality processing on the basis of the image quality parameters after adjusting with respect to the other part of the signal for displaying the same image in the image plane. Therefore, a user can optimize the image quality parameters while comparing images before and after adjusting image quality. Thus, it is possible to adjust image quality easily and reliably.

The entire disclosure of Japanese Patent Application No. 2002-350648 filed on Dec. 3, 2002 including the specification, claims, drawings and summary is incorporated herein by reference in its entirety.

What is claimed is:

1. An image signal processing apparatus comprising:
   an operation device which accepts operational instructions for changing an image quality parameter of an inputted image signal;
   an image signal generation circuit which generates an image signal for displaying at least two identical images based on the inputted image signal on one image plane;
   an image quality adjusting circuit which performs an image quality adjusting processing based on an image quality parameter before adjusting image quality with respect to a part of the generated image signal for displaying one of the identical images, and performs an image quality adjusting processing based on an image quality parameter after adjusting image quality with respect to another part of the generated image signal for displaying another one of the identical images, in response to the operational instructions for changing the image quality parameter accepted by the operation device wherein
   the image signal generation circuit comprises:
   a first line memory which stores a half horizontal scanning period of image data with respect to one horizontal scanning period of the inputted image data;
   a second line memory which stores the same image data as that the first line memory stores, the same image data being a half horizontal scanning period of image data; and
   a reading out device which reads out the half horizontal scanning period of image data stored in the first line memory at one half period in one horizontal scanning period, and reads out the half horizontal scanning period of image data stored in the second line memory at the other half period in one horizontal scanning period, and
   the image quality adjusting circuit adjusts the half horizontal scanning period of image data read out from the first line memory in accordance with the image quality parameter before adjusting image quality, and adjusts the half horizontal scanning period of image data read out from the second line memory in accordance with the image quality parameter after adjusting image quality.

2. The image signal processing apparatus according to claim 1, wherein the image signal generation circuit generates an image signal for displaying at least two identical images based on the inputted image signal on one image plane in response to the operational instructions for changing the image quality parameter accepted by the operation device.

3. The image signal processing apparatus according to claim 1, wherein the apparatus further comprises:
   an image quality parameter displaying signal generation circuit which generates an image quality parameter displaying signal for displaying adjusted values of the image quality parameters before and after adjusting image quality; and
   a superimposing circuit which superimposes the image quality parameter displaying signal on the generated image signal for displaying at least two identical images.

4. An image signal processing method comprising the processes of:
   accepting operational instructions for changing an image quality parameter of an inputted image signal;
   generating an image signal for displaying at least two identical images based on the inputted image signal on one image plane;
   performing an image quality adjusting processing based on an image quality parameter before adjusting image quality with respect to a part of the generated image signal for displaying one of the identical images; and
   performing an image quality adjusting processing based on an image quality parameter after adjusting image quality with respect to another part of the generated image signal for displaying another one of the identical images, in response to the accepted operational instructions for changing the image quality parameter, wherein
   the process of generating the image signal for displaying at least two identical images comprises the processes of:

storing a half horizontal scanning period of image data in a first line memory with respect to one horizontal scanning period of the inputted image data;

storing the same image data in a second line memory as that the first line memory stores, the same image data being a half horizontal scanning period of image data;

reading out the half horizontal scanning period of image data stored in the first line memory at one half period in one horizontal scanning period; and reading out the half horizontal scanning period of image data stored in the second line memory at the other half period in one horizontal scanning period, the process of performing an image quality adjusting processing based on an image quality parameter before adjusting image quality comprises the process of adjusting the half horizontal scanning period of image data read out from the first line memory in accordance with the image quality parameter before adjusting image quality, and the process of performing an image quality adjusting processing based on an image quality parameter after adjusting image quality comprises the process of adjusting the half horizontal scanning period of image data read out from the second line memory in accordance with the image quality parameter after adjusting image quality.

5. The image signal processing method according to claim 4, wherein the process of generating an image signal generates an image signal for displaying at least two identical images based on the inputted image signal on one image plane in response to the accepted operational instructions for changing the image quality parameter.

6. The image signal processing method according to claim 4, wherein the method further comprises the processes of:

generating an image quality parameter displaying signal for displaying adjusted values of the image quality parameters before and after adjusting image quality; and superimposing the image quality parameter displaying signal on the generated image signal for displaying at least two identical images.

* * * * *